United States Patent
McNamara et al.

(10) Patent No.: US 7,609,686 B1
(45) Date of Patent: Oct. 27, 2009

(54) MASS MULTIMEDIA MESSAGING

(75) Inventors: Justin McNamara, Atlanta, GA (US); Anastasios L. Kefalas, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 779 days.

(21) Appl. No.: 10/978,322

(22) Filed: Nov. 1, 2004

(51) Int. Cl.
*H04L 12/66* (2006.01)
(52) U.S. Cl. .......... 370/356; 370/389; 379/88.17; 379/218.02; 455/412.1; 455/413; 455/466; 705/14; 707/200; 709/206; 709/238; 709/246; 725/135
(58) Field of Classification Search .......... 370/356, 370/389; 379/67.1, 88.17, 114.28, 218.02; 709/238, 206, 246; 725/135; 455/412.1, 455/413, 466; 705/14; 707/200
See application file for complete search history.

(56) References Cited

U.S. PATENT DOCUMENTS

| | | | | |
|---|---|---|---|---|
| 5,630,060 | A * | 5/1997 | Tang et al. | 709/238 |
| 6,212,550 | B1 * | 4/2001 | Segur | 709/206 |
| 6,233,318 | B1 * | 5/2001 | Picard et al. | 379/88.17 |
| 6,718,168 | B2 * | 4/2004 | Ala-Luukko et al. | 455/412.1 |
| 6,751,463 | B1 * | 6/2004 | Lorello et al. | 455/466 |
| 6,795,711 | B1 * | 9/2004 | Sivula | 455/466 |
| 7,200,680 | B2 * | 4/2007 | Evans et al. | 709/246 |
| 2002/0120697 | A1 * | 8/2002 | Generous et al. | 709/206 |
| 2004/0014456 | A1 * | 1/2004 | Vnnen | 455/413 |
| 2004/0111476 | A1 * | 6/2004 | Trossen et al. | 709/206 |
| 2004/0249864 | A1 * | 12/2004 | Laumen et al. | 707/200 |
| 2004/0258063 | A1 * | 12/2004 | Raith et al. | 370/389 |
| 2005/0251848 | A1 * | 11/2005 | Al-Janabi | 725/135 |
| 2005/0276402 | A1 * | 12/2005 | Tang et al. | 379/114.28 |
| 2006/0015399 | A1 * | 1/2006 | Alberth et al. | 705/14 |
| 2007/0165790 | A1 * | 7/2007 | Taori | 379/67.1 |
| 2008/0123832 | A1 * | 5/2008 | Pines et al. | 379/218.02 |

OTHER PUBLICATIONS

Wireless Application Protocol Forum, LTD., Wireless Application Protocol WAP-248-UAPROF-20011020-a, WAG UAProf, Oct. 2001, Version 20, Mountain View, CA.

* cited by examiner

*Primary Examiner*—Gerald Gauthier
(74) *Attorney, Agent, or Firm*—Moazzam & Associates, LLC

(57) ABSTRACT

A method and system of mass multimedia messaging in a system having a service provider and a plurality of subscriber communication terminals supported by the service provider, wherein at least some of the subscriber terminals have different messaging capabilities and different message format requirements. The method includes adaptation and handling of a mass multimedia message, and mass multimedia message notification. The system uses a retrieval platform and a processing platform. The retrieval platform generates a unique message identifier for the mass multimedia message, and pre-adapts the message into adapted content messages for the terminal types supported by the service provider. The processing platform formats message notifications for the subscriber terminals based on each terminal's messaging capabilities, with each notification containing the unique message identifier.

32 Claims, 11 Drawing Sheets

500

```
POST /pap HTTP/1.1 authorization: Basic TU1TQ19JRDpNTVNDX1BXRA==
content-length: 753
content-type: multipart/related; boundary=asdlfkjiurwghasf;
type="application/xml"
Host: 36.99.128.183:9002

--asdlfkjiurwghasf
Content-type: application/xml
<?xml version="1.0"?>
<!DOCTYPE papPUBLIC "-//WAPFORUM//DTD PAP 1.0//EN"
"http://www.wapforum.org/ DTD/pap_1.0.dtd">
<pap>
    <push-message push-id="QR0H2iRjgLgAAHCxAAAABgAAAZ8AAAAA"
    source-reference="cingular Promotion MMSC">
    <address address-
value="WAPPUSH=7035014000/TYPE=PLMN@ppg.cingular.com"/>
    <quality-of-service delivery-method="unconfirmed" network="GSM"
bearer="SMS"/>
</push-message>
</pap>

--asdlfkjiurwghasf
X-Wap-Application-Id: 4
Content-type: application/vnd.wap.mms-message X-Mms-Message-Type: m-notification-ind
X-Mms-Transaction-ID: QR0H2iRjgLgAAHDWAAAABAAAAZoAAAAA
X-MMs-From-Address: cingularpromos@cingular.com
X-Mms-MMS-Version: 1.0
X-Mms-Message-Class: Personal
X-Mms-Message-Size: 5
X-Mms-Expiry: 14
X-Mms-Content-Location:
http://retrieval_platform.cingular.com:8080/Unique_message_id
--asdlfkjiurwghasf--..
```

502 — (Content-type: application/vnd.wap.mms-message)

504 — (X-Mms-Content-Location line)

MASS MULTIMEDIA MESSAGING

CROSS-REFERENCE TO RELATED APPLICATIONS

None.

BACKGROUND OF THE INVENTION

A. Field of Invention

This invention relates to mass multimedia messaging by a service provider. More particularly, the invention relates to a method and system for mass multimedia messaging, including adaptation and handling of a mass multimedia message, and mass multimedia message notification in a system having a service provider and a plurality of subscriber communication terminals supported by the service provider, wherein at least some of the subscriber communication terminals have different messaging capabilities and different message format requirements.

B. Description of Related Art

Both wireless and wireline telecommunications systems have evolved from voice only systems to systems having text and rich multimedia messaging capabilities. This has created opportunities for mass messaging, such as promotional and bulk messaging. Such mass messaging capabilities currently exist using Short Message Service (SMS) technology, allowing content providers to forward a single short text message and a list of subscriber addresses to a service provider for mass text messaging to all subscriber addresses on the list. Multimedia messaging, such as Multimedia Message Service (MMS) and Wireless Application Protocol (WAP) Push, expand messaging capabilities to include audio, image and video content, but there is no equivalent mass messaging service available for multimedia messages.

One reason that multimedia messages are currently handled individually is that there is a wide range of capabilities among various types of subscriber communication terminals. For instance, some communication terminals have only SMS capabilities. Other communication terminals are capable of receiving WAP Push messages, and then viewing multimedia content using a microbrowser application program contained in the communication terminal software. Still other communication terminals have MMS capabilities and are able to receive and show (or play) multimedia objects on the mobile terminal. However, format requirements, such as hardware screen sizes and audio, image and video file formats, vary even between multimedia capable terminals. Thus, presently, the multimedia messaging system must adapt the content of each message for the capabilities of the communication terminal to which it is directed (known as "adaptation-on-the-fly"). This individual message content adaptation is particularly inefficient in a mass multimedia messaging scenario, as many adapted messages will be mere duplicates of other messages already adapted for communication terminals having the same or very similar capabilities. This unnecessary duplication of adapted message utilizes processing resources and requires additional storage capacities of the messaging system. Thus, there is a need for a more efficient system and method for mass multimedia messaging that provides content adaptation without unnecessary duplication of the adapted messages.

Such a system and method will also require a new method of providing message notification to the subscriber communication terminals. Thus, there is also a need for a system and method for mass multimedia message notification to subscriber terminals.

Additionally, once a multimedia message is delivered to the service provider, the content provider may wish to replace the message or parameters associated with the message, such as a promotion expiration date or an updated subscriber address list. Currently, the content provider has only a limited ability to replace the message or certain parameters of the message, and content adaptation for the replaced message must be done "on-the-fly". Thus, there is yet a further need for a system and method for mass multimedia messaging that provides for message and message parameter replacement, with efficient content adaptation as discussed above.

Further, content providers desire the ability to track how many subscribers have retrieved a mass multimedia message. As individually handled messages, tracking delivery requires tracking each message individually. Service providers desire an easier way to track how many subscribers have retrieved a mass message. Thus, there is still further a need for a system and method for mass multimedia messaging that provides tracking of how many subscribers have retrieved a mass message without having to track the messages individually.

SUMMARY OF THE INVENTION

The system and method of the present invention meets these needs, and others, by providing adaptation and handling of a mass multimedia message, and mass multimedia message notification. Advantageously, the invention allows the service provider to save resources by pre-adapting and storing the multimedia message only once for each terminal type supported by the service provider. Also, the processing of the mass multimedia message no longer requires adaptation-on-the-fly, which speeds up message delivery.

Still further, the system and method of the invention provides a reporting interface that will periodically publish the results of a promotion. This interface will also allow a polling interface to request current results.

Additional functionality will allow the invention to receive periodic updates of the promotional message so subscribers can just refresh the message from their handsets. This same functionality will allow replacement of the message or message parameters, such as the subscriber list or the promotion expiration, prior to retrieval of the message.

Thus, in one aspect of the invention is a method of mass multimedia messaging in a system including a service provider and a plurality of terminals supported by the service provider, wherein at least some of the terminals are of terminal types have differing messaging capabilities and differing message format requirements. This method includes the following steps: receiving a multimedia message and a list of subscriber terminal addresses from a content provider; generating a unique message identifier for the multimedia message; adapting the multimedia message into adapted content messages for each supported terminal type using terminal format requirements information for the terminal types supported by the service provider; indexing each the adapted content message with a corresponding terminal type identifier and the message identifier; and formatting message notifications containing the message identifier for each subscriber address based on subscriber terminal messaging capabilities information for the corresponding subscriber terminals.

Advantageously, the method of may also include the steps of: sending the formatted message notifications to the subscriber terminal addresses; receiving requests for the multimedia message from subscriber terminals in response to sending the formatted message notifications to the subscriber terminal addresses, each request containing terminal type information, an address for the requesting subscriber terminal, and the message identifier; selecting an adapted content message for each request based on the message identifier and the terminal type information; and sending the selected adapted message to the corresponding subscriber terminal address associated with each request.

Still further, where the subscriber terminal messaging capabilities information includes information as to whether each subscriber terminal is SMS capable, WAP Push capable, or MMS capable, the step of formatting each message notification could include: determining if the subscriber terminal is capable of receiving MMS messages; if it is determined that the subscriber terminal is capable of receiving MMS messages, then formatting the message notification as a MMS WAP Push notification; if it is determined that the subscriber terminal is not capable of receiving MMS messages, then determining if the subscriber terminal is capable of receiving WAP Push messages; if it is determined that the subscriber terminal is capable of receiving WAP Push messages, then formatting the message notification as a WAP Push notification; and if it is determined that the subscriber terminal is not capable of receiving WAP Push messages, then formatting the message notification as a SMS message.

More specifically, the method may further include adapting the multimedia message into a default adapted content message for a default terminal type using default terminal format requirements information, and indexing the default adapted content message with a default terminal type identifier and the message identifier.

In order to achieve the functionality of reporting and message replacement, the method may further include the steps of: generating a promotional identifier associated with the multimedia message; and returning the promotional identifier to the content provider. This would permit receiving an order from the content provider to replace or cancel the multimedia message or to replace or cancel at least one parameter associated with the multimedia message using the promotional identifier. Further, this would permit tallying retrieval information for the multimedia message in a report associated with the promotional identifier. The method could then include the step of publishing the report periodically to the content provider. Alternatively, the method could include the steps of: receiving a request for the report from the content provider; and publishing the report to the content provider in response to the request for the report.

Another aspect of the invention is a method of providing mass multimedia message notification to subscriber terminals wherein at least some of the terminals have different messaging capabilities. This method includes the following steps: receiving a multimedia message and a list of subscriber terminal addresses from a content provider; obtaining a unique message identifier for the multimedia message; obtaining subscriber terminal messaging capabilities information for each subscriber address; and formatting message notifications for each subscriber terminal address based on the subscriber terminal messaging capabilities information, the message notifications each including the message identifier.

Where a retrieval platform is utilized, the step of obtaining a unique message identifier for the multimedia message could include the steps of: sending the multimedia message to the retrieval platform; and receiving the unique message identifier from the retrieval platform.

Where a subscriber information database is utilized, the step of obtaining subscriber terminal messaging capabilities information could include: requesting the subscriber terminal messaging capabilities information for each subscriber terminal from the subscriber information database using the subscriber terminal addresses; and receiving the subscriber terminal messaging capabilities information for each subscriber terminal from the subscriber information database.

In the scenario where the subscriber terminal messaging capabilities information includes information as to whether each subscriber terminal is SMS capable, WAP Push capable, or MMS capable, the step of formatting message notifications could further include: determining if the subscriber terminal is capable of receiving MMS messages; if it is determined that the subscriber terminal is capable of receiving MMS messages, then formatting the message notification as a MMS WAP Push notification; if it is determined that the subscriber terminal is not capable of receiving MMS messages, then determining if the subscriber terminal is capable of receiving WAP Push messages; if it is determined that the subscriber terminal is capable of receiving WAP Push messages, then formatting the message notification as a WAP Push notification; and if it is determined that the subscriber terminal is not capable of receiving WAP Push messages, then formatting the message notification as a SMS message.

The method could also further include the step of sending the formatted message notifications to the subscriber terminals using the subscriber terminal addresses.

Yet another aspect of the invention is a method of mass multimedia message adaptation and handling in a system including a service provider and a plurality of terminals supported by the service provider, wherein at least some of the terminals are of different terminal types. This method includes the steps of: receiving a multimedia message; providing a unique message identifier for the multimedia message; adapting the multimedia message into adapted content messages for each supported terminal type using terminal format requirements information for the terminal types supported by the service provider; and indexing each of the adapted content messages with a corresponding terminal type identifier and with the message identifier, so as to enable the adapted content message to be later retrieved by subscriber terminals requesting the multimedia message using the message identifier and terminal type identifiers.

Where a processing platform is utilized, the step of receiving a multimedia message could include receiving the multimedia message from the processing platform. Further, this aspect of the invention could also then include sending the message identifier to the processing platform.

Where the terminal format requirements information is stored in a user agent profiles database, the method could further include obtaining the terminal format requirements information for terminal types supported by the system from the user agent profiles database.

To facilitate retrieval of the adapted content messages, the method could still further include storing the indexed adapted content messages in a table associated with the message identifier. Then, the method could include the steps of: receiving requests for the multimedia message from subscriber terminals, with each the request containing terminal type information for the requesting subscriber terminal, an address for the requesting subscriber terminal, and the message identifier; selecting an adapted content message for each request from the table using the message identifier and the terminal type information; and sending the selected adapted messages to the corresponding subscriber terminal address associated with each request.

The method could further include adapting the multimedia message into a default adapted content message for a default terminal type using default terminal format requirements information, and indexing the default adapted content message with a default terminal type identifier and the message identifier.

To facilitate the message replacement functionality of the invention, the method could still further include generating a promotional identifier associated with the multimedia message. Then, the promotional identifier could be used in an order to replace or cancel the multimedia message, or to replace or cancel at least one parameter associated with the multimedia message.

Additionally, to facilitate the reporting functionality of the invention, the method could also include tallying retrieval information for the multimedia message in a report associated with the promotional identifier. The method could then include periodically publishing the report to the content provider, or publishing the report in response to a request from the content provider.

Still an even further aspect of the invention is a system for mass multimedia messaging by a service provider, wherein the service provider supports communications terminals having different format requirements and different messaging capabilities, and wherein a content provider provides a multimedia message and a list of subscriber terminal addresses to which the service provider is to deliver the message. This system includes a retrieval platform and a processing platform. The retrieval platform is for: providing a unique message identifier for the multimedia message; adapting the multimedia message into adapted content messages for each supported terminal type based on terminal format requirements information for the terminal types supported by the service provider; and indexing each of the adapted content messages with a corresponding terminal type identifier and with the message identifier, so as to enable the adapted content message to be retrieved by a subscriber terminal requesting the multimedia message using the message identifier and terminal type identifier. The processing platform is in communication with the retrieval platform, and is operational for: obtaining subscriber terminal messaging capabilities information for each subscriber address; and formatting message notifications for each subscriber terminal address based on the subscriber terminal messaging capabilities information, where the message notifications each containing the message identifier.

The system could further have a user agent profiles database relating supported terminal type information with terminal format requirements information, and an adaptation engine for adapting multimedia messages for supported terminal types. The adaptation engine would be in communication with the user agent profiles database and the retrieval platform. The adaptation engine would be for: receiving the multimedia message from the retrieval platform; obtaining terminal format requirements information for terminal types supported by the service provider system from the user agent profiles database; adapting the multimedia message into adapted content messages for each supported terminal type using the terminal format requirements information; and returning the adapted content messages and corresponding terminal type identifiers to the retrieval platform.

The system could still further have a subscriber information database relating subscriber terminal address information with subscriber terminal messaging capabilities information. The subscriber information database would be in communication with the processing platform, such that the processing platform is able to obtain the subscriber terminal messaging capabilities information from the subscriber information database.

For retrieval of the adapted content messages, the retrieval platform could further receive requests for the multimedia message from subscriber terminals, with each request containing terminal type information for the requesting terminal, an address for the requesting terminal and the message identifier. Then, the retrieval platform could select an adapted content message for each request using the message identifier and the terminal type information.

Additionally, the system could further have a reporting platform for tracking how many subscribers have retrieved the multimedia message and reporting this information to the content provider. The reporting platform would be in communication with the processing platform, the retrieval platform and the content provider.

The system aspect of the invention could be implemented on digital computing equipment. Further, the various method aspects of the invention may be found as executable instructions in computer software contained on a computer readable medium. However, one of skill in the art will recognize that the invention can be implemented using other, equivalent devices and steps.

BRIEF DESCRIPTION OF THE DRAWINGS

FIG. 5 is a diagram of an exemplary MMS WAP Push message notification, as might be used with an aspect of the invention.

DETAILED DESCRIPTION OF EXEMPLARY EMBODIMENTS

It should be noted that many of the principles of the invention described and claimed herein will apply equally to wireline and other telecommunication systems, as well as to the wireless system shown and described herein. Thus, the use of exemplary message delivery and retrieval system components described herein should not be construed as a limitation on either the spirit or the scope of the claimed invention.

Figure 1:
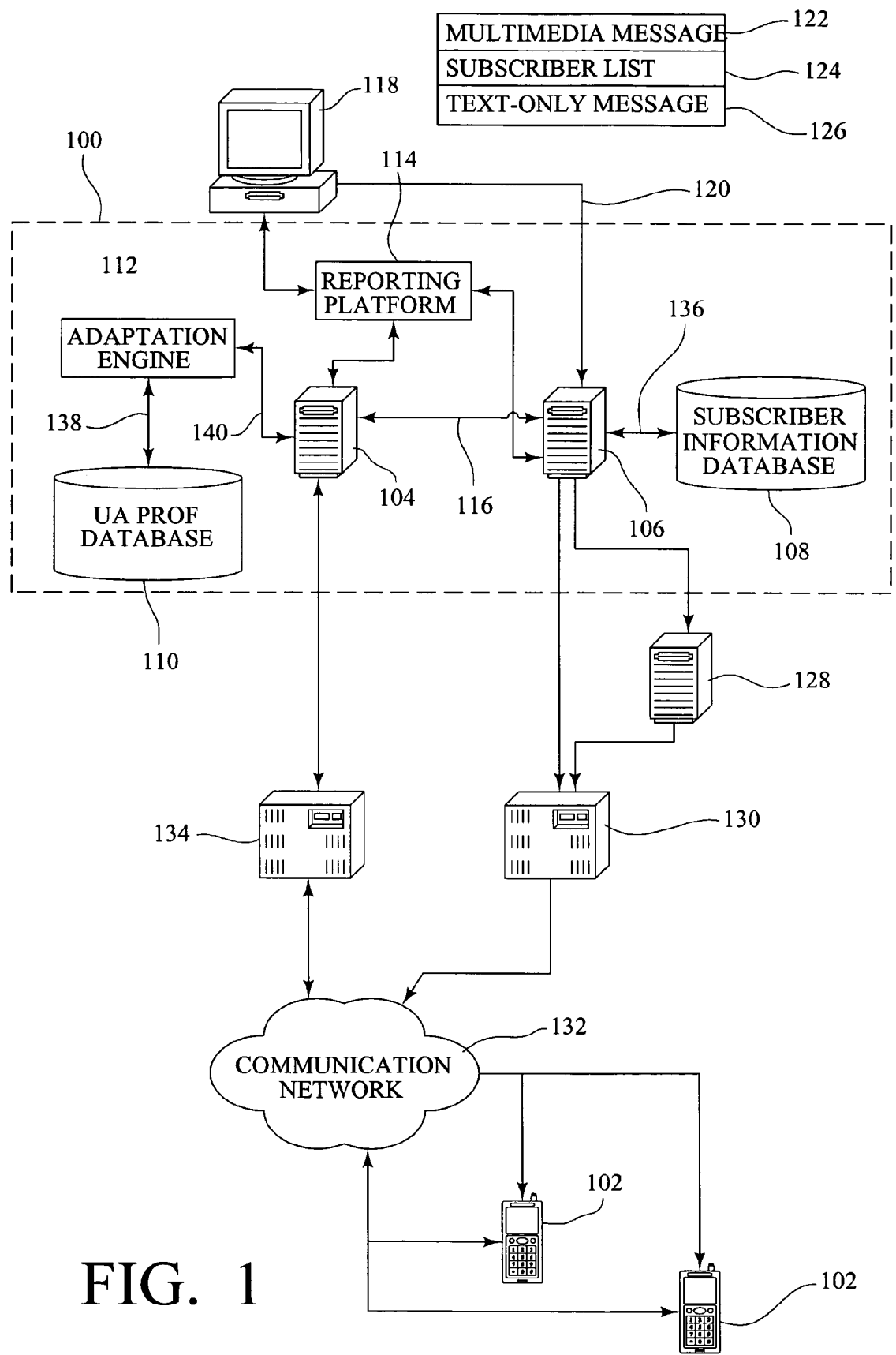
FIG. 1 is a diagram of an exemplary system for mass multimedia messaging by a service provider, wherein the service provider supports communication terminals having different format requirements and different messaging capabilities, according to the present invention.

FIG. 1. shows an exemplary system 100 for mass multimedia messaging by a service provider that supports subscriber communication terminals 102 having different format requirements and different messaging capabilities. The exemplary system 100 has a retrieval platform 104, a processing platform 106, a subscriber information database 108, a user agent profiles database 110, an adaptation engine 112, and a reporting platform 114.

While shown as stand-alone, server-type devices, the retrieval platform 104 and the processing platform 106 could also be combined with each other or with other functional platforms in a more centralized computing system architecture. In the stand-alone configuration shown, the retrieval platform 104 and the processing platform 106 are in communication with each other through a retrieval platform—processing platform communication link 116. This communication link 116 could use any functional two-way, server-to-server protocol to facilitate the flow of information between the retrieval platform and the processing platform. This configuration, as will be discussed, provides efficient use of the resources of each platform to provide an overall system that addresses the need for efficient and effective mass multimedia messaging.

Also shown is a representation of a content provider 118 in communication with the system 100 over a content provider—mass multimedia messaging system communication link 120. For convenience, this link 120 is shown between the content provider 118 and the processing platform 106. However, one of skill in the art will understand that the link could also be between the content provider 118 and the retrieval platform 104. This link 120 could be a secure HTTP-type connection, such as SSL, VPN or T1 frame relay connections.

In operation, the content provider 118 will send a multimedia message 122 and a list of subscriber terminal addresses 124, such as telephone numbers, to which the message is directed to the system 100. The message 122 and address list 124 "feed" could be delivered using an XML/SOAP (Extensible Markup Language/Simple Object Access Protocol) type protocol, such as an MM7 interface protocol. The multimedia message may be in a SMIL (Synchronized Multimedia Integration Language) format, or an equivalent multimedia format. Additionally, the content provider 118 may also include a text-only message 126 along with the feed, for delivery to terminals 102 that are only capable of receiving text messages.

Also shown are other components of a messaging system, including: a push proxy gateway (PPG) 128, an SMS Centre (SMSC) 130, a communication network 132, and a WAP Gateway 134. The SMSC 130 sends SMS messages through the communication network 132 to the subscriber communication terminals 102. The PPG 128 and the SMSC 130 cooperate to send SMS format message notifications through the communications network 132 to the subscriber communication terminals 102. Alternatively, the functionality of the PPG 128 could be performed by the processing platform 106, eliminating the need for the PPG 128 and allowing the processing platform 106 to send such notifications directly to the SMSC 130. Once the subscriber terminals 102 have received a message notification, the subscriber terminals 102 utilize the communication network 132 and the WAP Gateway 134 to retrieve the associated multimedia message from the system 100 utilizing an appropriate data bearer, such as GPRS (General Packet Radio Service) or EDGE (Enhanced Data for GSM Evolution).

Figure 2:
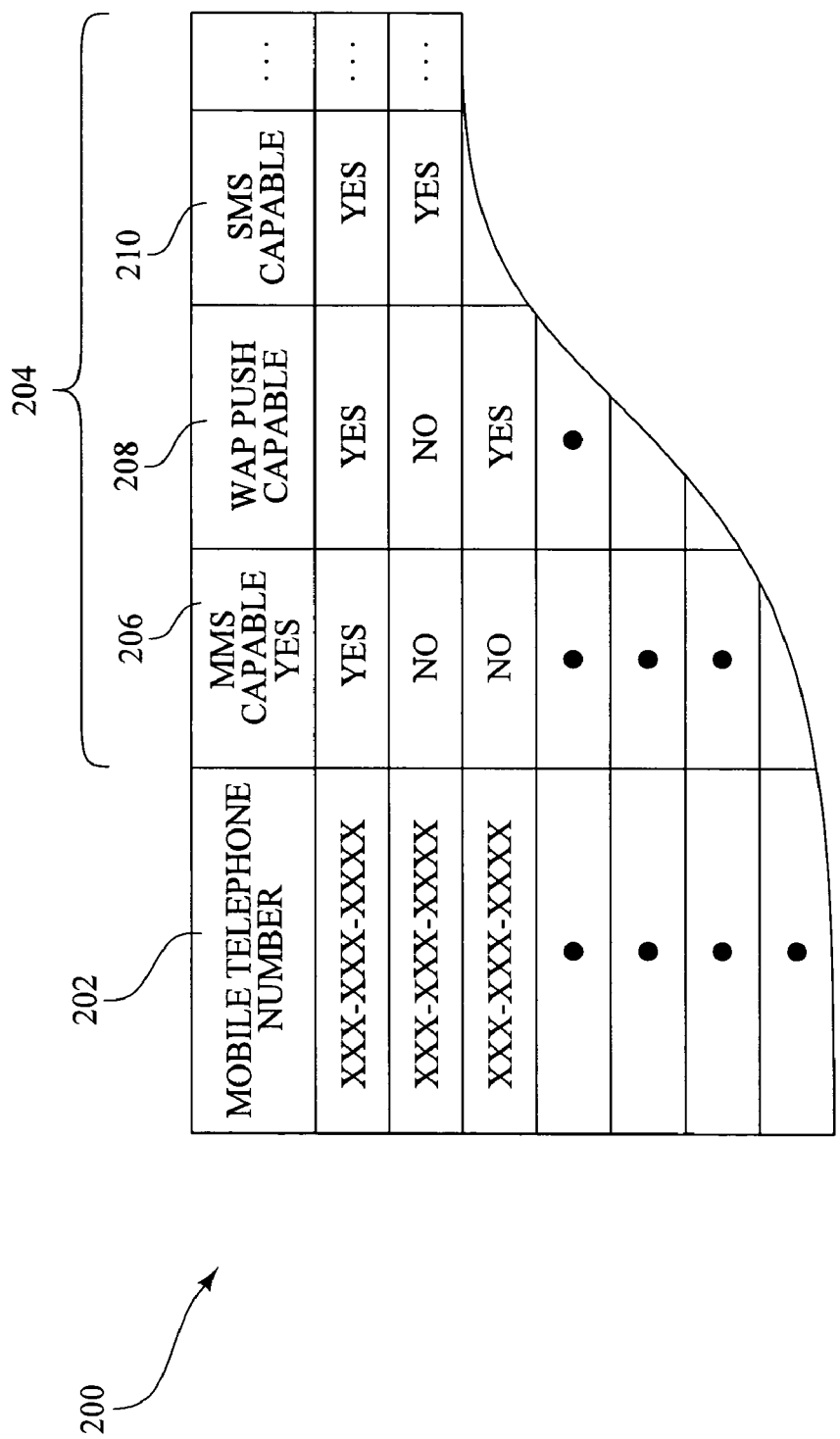
FIG. 2 is a diagram of the data structure of an exemplary subscriber information database, as might be used with the system of the invention.

FIG. 2 shows the structure of an exemplary subscriber information database 200 provisioned with data relating subscriber terminal address information 202 with messaging capabilities information 204 for the corresponding subscriber terminals. More specifically, the exemplary subscriber information database 200 contains information regarding the messaging capabilities of each subscriber terminal, such as whether each terminal is: MMS Capable 206; WAP Push Capable 208; and SMS Capable 210. This messaging capabilities information 204 is indexed or otherwise related to the subscriber terminal address information 202, i.e. the telephone numbers of each of those terminals.

Returning to FIG. 1, it is seen that the subscriber information database 108 is in communication with the processing platform 106 through a subscriber information database-processing platform communication link 136. This link 136 could be an LDAP (Lightweight Directory Access Protocol) or equivalent communication link. Alternatively, the subscriber information database 108 may be integrated with the processing platform 106 and communicate over a bus or equivalent data communication structure.

Figure 3:
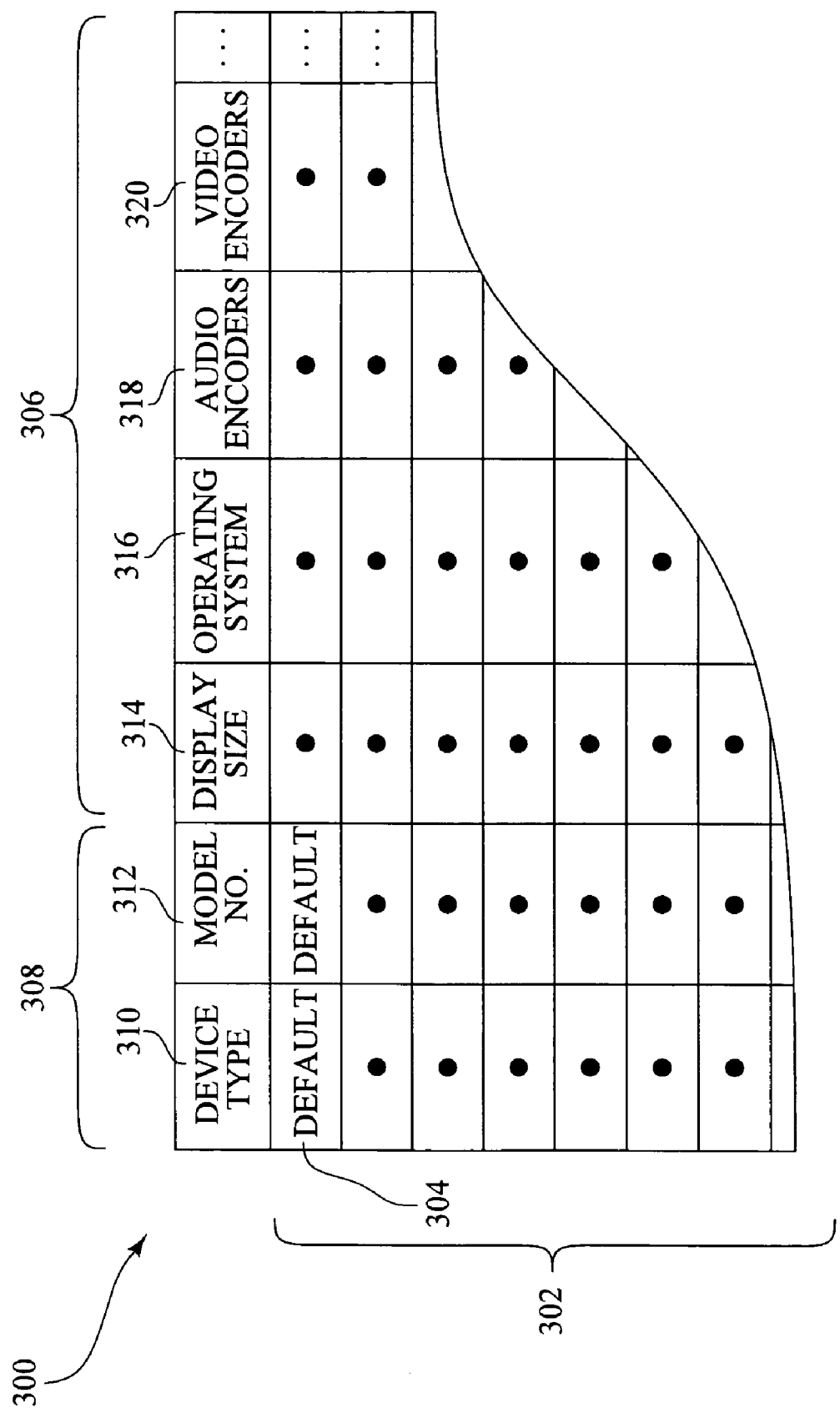
FIG. 3 is a diagram of the data structure of an exemplary user agent profiles database, as might be used with the system of the invention.

FIG. 3 shows the structure of an exemplary user agent profiles database 300. The exemplary user agent profiles database 300 according to the invention is provisioned with a list 302 of all terminal types supported by the service provider, including a default terminal type 304, and format requirements information 306 for each terminal type. The list 302 of supported terminal types would include terminal type identifiers 308, such as device types 310 and model numbers 312. The terminal format requirements information 306 would include information such as hardware display sizes 314, operating system software 316, audio encoders 318 supported by the device, and video encoders 320 supported by the device. The terminal format requirements information 306 for the default terminal 304 would contain default characteristics.

Returning again to FIG. 1, it is seen that the user agent profiles database 110 is in communication with the adaptation engine 112 through a user agent profiles database-adaptation engine communication link 138. This link 138 could be an LDAP or equivalent communication link. Alternatively, the user agent profiles database may be integrated with the adaptation engine, communicating through a bus or equivalent data communication structure.

The adaptation engine 112 is a computing device that is operative to receive a multimedia message, obtain terminal format requirements information for the terminal types supported by the service provider from the user agent profiles database, and adapt the multimedia message into adapted content messages meeting the terminal format requirements for each supported terminal type. The adaptation engine 112 is in communication with the retrieval platform 104 through an adaptation engine—retrieval platform communication link 140. This link could use a client-server protocol such as SOAP/HTTP, or the equivalent. Alternatively, the adaptation engine could be integrated with the retrieval platform and communicate over a bus or equivalent data structure.

In operation, the processing platform 106 receives the mass multimedia message 122 and the list of subscribers addresses 124 from the content provider 118. The processing platform 106 then sends the multimedia message 122 to the retrieval platform 104. The processing platform 106 could include an identifier of Mass Media when sending the multimedia message 122 to the retrieval platform 104.

The retrieval platform 104 receives the multimedia message 122, generates a unique message identifier for the multimedia message, and returns the message identifier to the processing platform 106. The message identifier of the exemplary system is from 10 to 32 characters in length, in order to allow a message notification containing the message identifier to have less than the 160 character limit for SMS messages. The message identifier will be used in conjunction with the retrieval platform's DNS address to facilitate retrieval of the multimedia message by the subscriber terminals 102. The retrieval platform 104 also sends the multimedia message 122 to the adaptation engine 112.

The adaptation engine 112 receives the multimedia message 122 from the retrieval platform 104. Then, the adaptation engine 112 obtains terminal format requirements information for the terminal types supported by the service provider system, plus the default terminal type, from the user agent profiles database 110. Using the terminal format requirements information, the adaptation engine 112 adapts the multimedia message 122 into adapted content messages for each supported terminal type, plus the default terminal type. For example, the multimedia message 122 will be adapted for different display sizes, and different audio and video file format requirements for different MMS capable terminals. Additionally, the multimedia message 122 will be adapted into multiple WML pages to allow WAP Push retrieval. The adaptation engine 112 then sends the adapted messages, along with corresponding terminal type identifiers, back to the retrieval platform 104.

The retrieval platform 104 then receives the adapted content messages and corresponding terminal type identifiers, and indexes the adapted content messages and identifiers in a table associated with the message identifier. Thus, the retrieval platform 104 of the exemplary embodiment adapts the multimedia message 122 only once for each supported terminal type, and stores those adapted content messages in a format for easy retrieval. This eliminates the unnecessary duplication and wasted use of resources of the adaptation-on-the-fly method.

Figure 4:
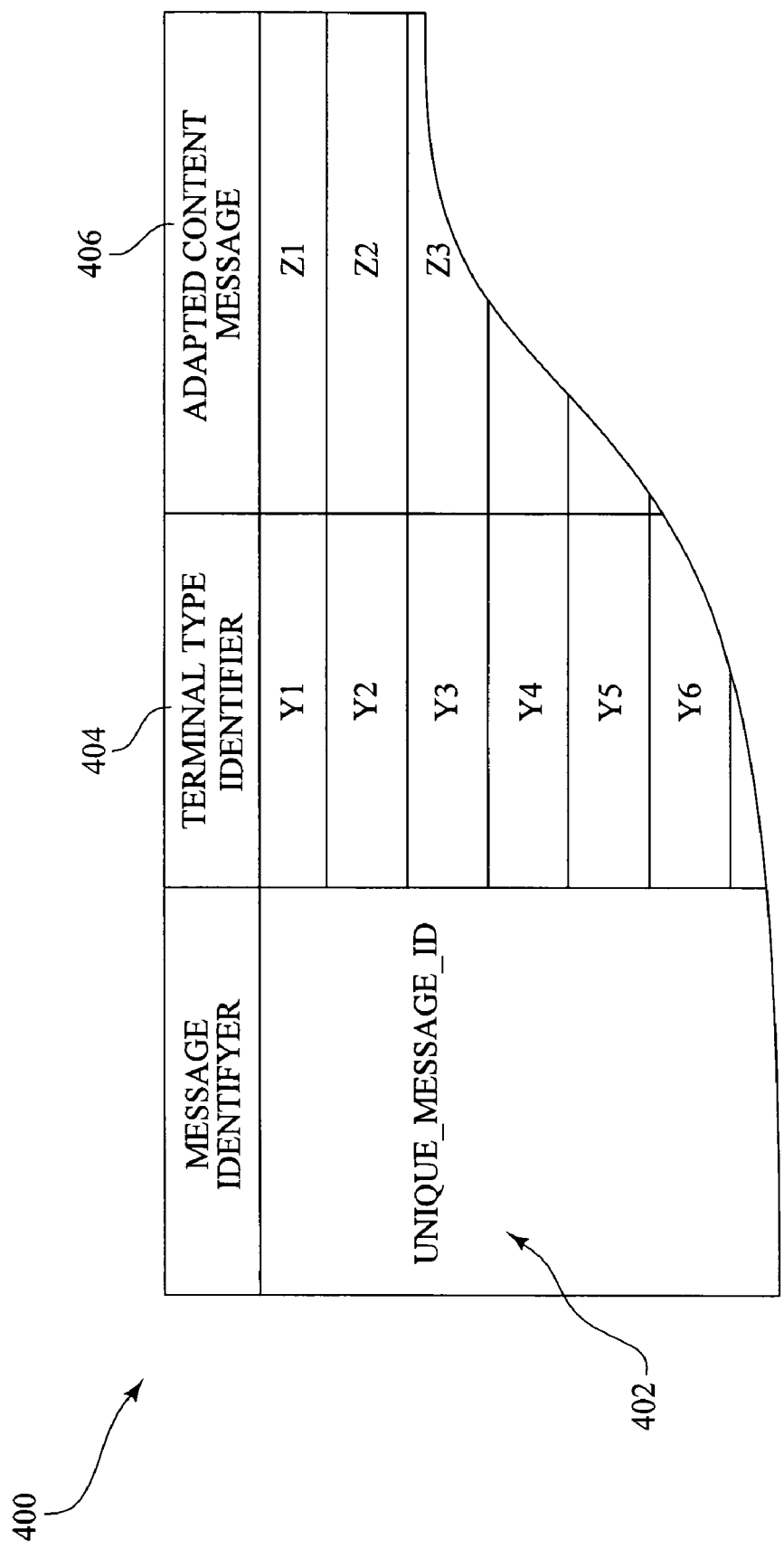
FIG. 4 is a diagram of the data structure of an exemplary table relating the message identifier, terminal type identifiers, and adapted content messages, as might be used with the system of the invention.

FIG. 4 shows an exemplary table 400 relating the message identifier 402, terminal type identifiers 404 and adapted content messages 406.

Upon receipt of the unique message identifier from the retrieval platform 104, the processing platform 106 verifies each subscriber address and obtains subscriber terminal messaging capabilities information for each subscriber address from the subscriber information database 108. The processing platform 106 then uses the subscriber terminal messaging capabilities information to format message notifications for each subscriber terminal address. For instance, if the messaging capabilities information indicates that the subscriber terminal is MMS capable, the processing platform 106 will format the message notification as an MMS WAP Push notification. If the messaging capabilities information indicates that the subscriber terminal is WAP Push capable, but not MMS capable, the processing platform 106 will format the message notification as a WAP Push notification.

FIG. 5 shows an exemplary MMS WAP Push message notification 500. Such a notification will contain an indication that it is a multimedia message notification 502, and will also contain a location address for the multimedia message content 504 containing the retrieval platform's DNS address and the unique message identifier 506.

Figure 6:
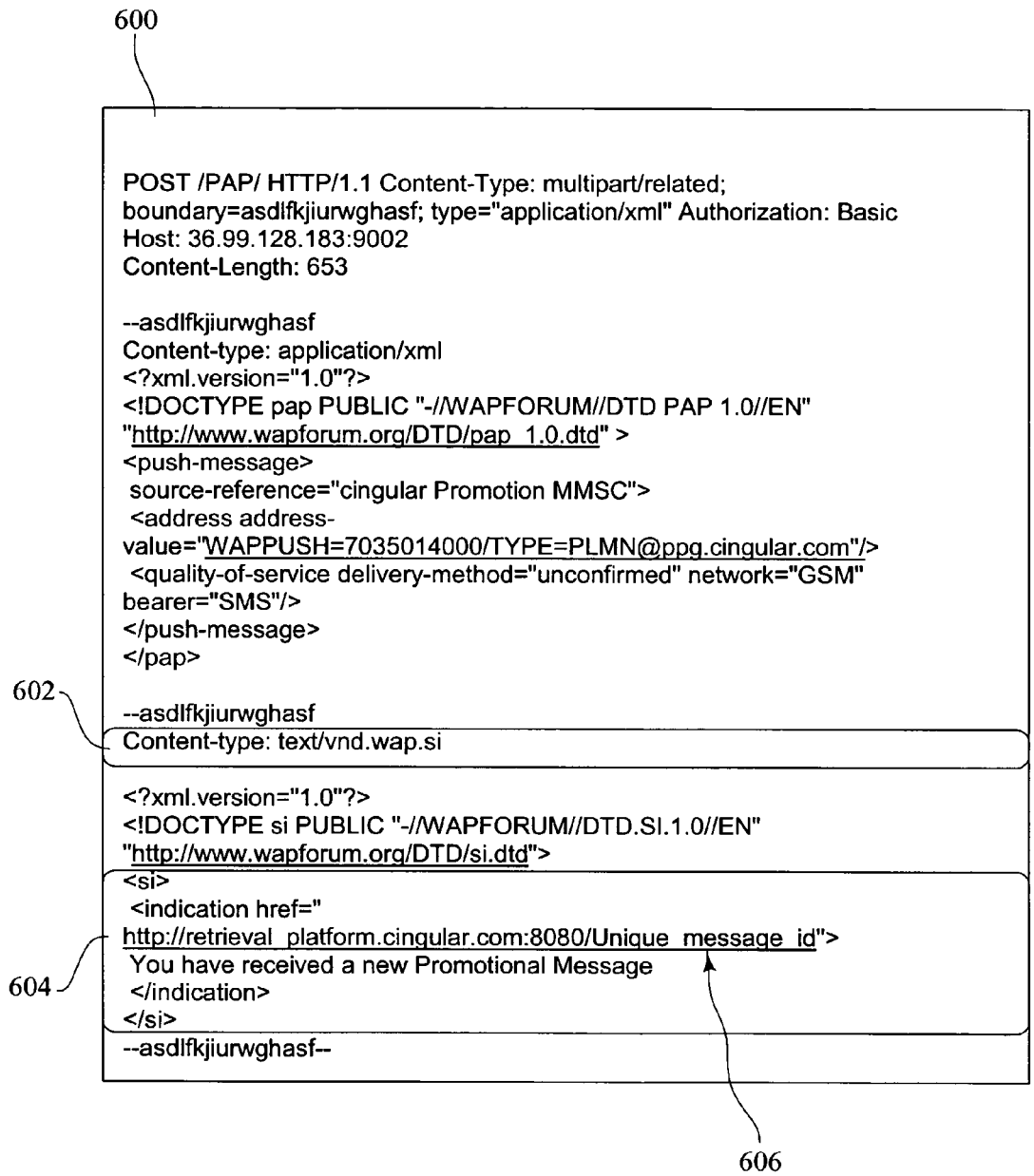
FIG. 6 is a diagram of an exemplary WAP Push message notification, as might be used with an aspect of the invention.

FIG. 6 shows an exemplary WAP Push message notification 600. Such a notification will contain an indication that it is a WAP Push message notification 602, and will contain a service indication reference for the WAP Push message 604, also containing the retrieval platform's DNS address and the unique message identifier 606.

Returning now to FIG. 1, if the messaging capabilities information indicates that the subscriber terminal is only SMS capable, the processing platform 106 can: (1) format the message notification as an actual SMS message containing the text-only message 126; or (2) format the message notification as an SMS message containing a URL for a web-version of the message that the user could retrieve with a web-enabled device. The text-only message 126 could either be: (1) provided by the content provider along with the multimedia message, as described earlier; or (2) stripped from the multimedia message 122 by removing the first 160 characters of the text of the message.

The processing platform 106 then sends the formatted message notifications to the subscriber terminal addresses using the push proxy gateway 128, the SMSC 130, and the communications network 132, as shown. Thus, the processing platform 106 of the exemplary embodiment provides mass multimedia message notification for subscriber terminals 102 having various messaging capabilities, efficiently handling this function.

Upon receipt of the message notifications, the multimedia capable subscriber terminals 102 then send requests through the communications network 132 and WAP Gateway 134, as shown, to retrieve an appropriate adapted content message from the retrieval platform 104. Each retrieval request contains terminal type information and the address for the requesting subscriber terminal, and the unique message identifier. For example, the terminal type information for a wireless phone might include make and model information for the phone.

Figure 7:
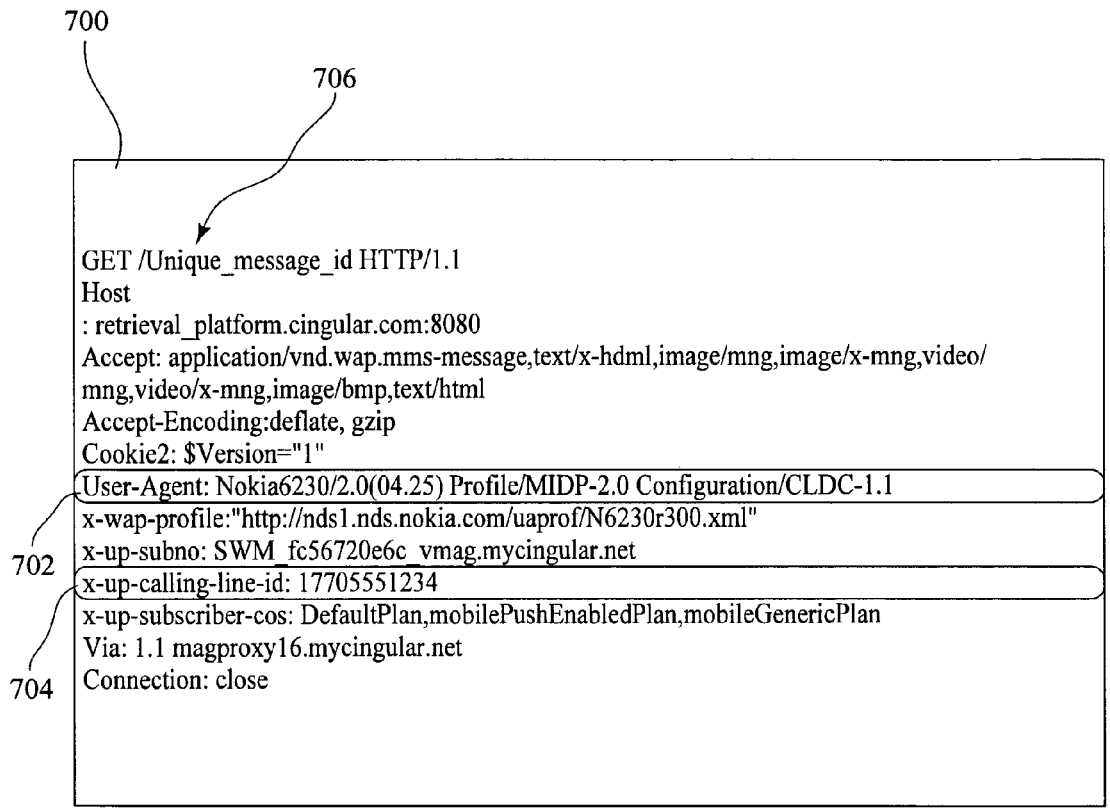
FIG. 7 is a diagram of an exemplary MMS Message Retrieval Request, as might be used with an aspect of the invention.

FIG. 7 shows an exemplary MMS retrieval request 700 utilizing a HTTP GET command. The terminal type information 702 is contained in a portion of the command known as the User Agent (UA) Header. The MMS retrieval request 700 also contains the address 704, or phone number, for the requesting terminal, and the unique message identifier 706.

The retrieval platform 104 then receives the requests for the multimedia message from the subscriber terminals 102. As discussed, each request contains terminal type information and the address for the requesting subscriber terminal, and the unique message identifier. Using this information, the retrieval platform 104 selects an adapted content message for each request from the table associated with the message identifier. Then the retrieval platform 104 sends the selected adapted content messages to the corresponding subscriber terminal addresses that initiated the requests, thus accomplishing mass multimedia messaging.

Figure 8:
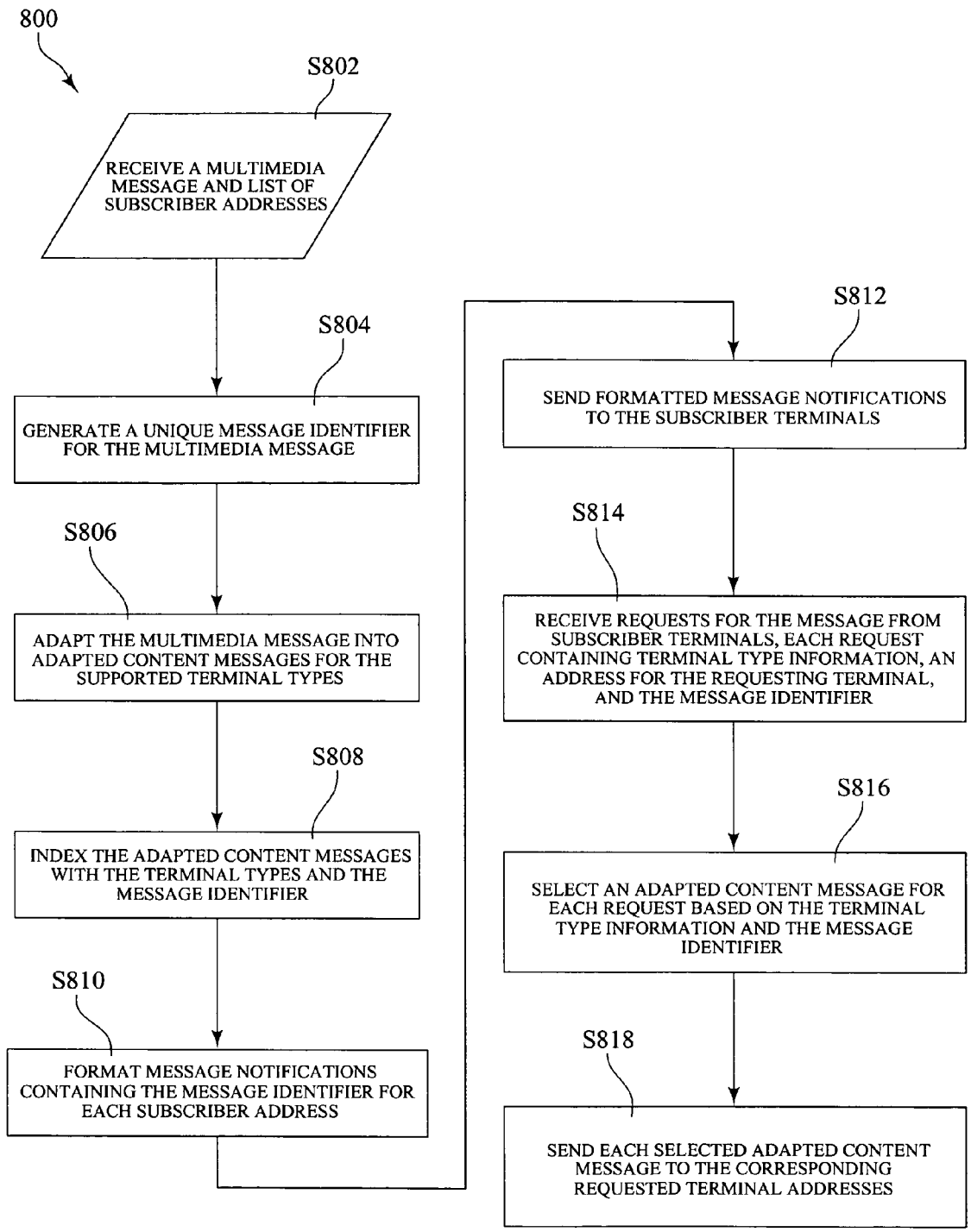
FIG. 8 is a flow diagram of an exemplary system level method according to the present invention.

FIG. 8 shows an exemplary method 800 of mass multimedia messaging in a system including a service provider and a plurality of terminals supported by the service provider, wherein at least some of the terminals are of different terminal types, including the steps of: S802 receiving a multimedia message and a list of subscriber terminal addresses from a content provider; S804 generating a unique message identifier for the multimedia message; S806 adapting the multimedia message into adapted content messages for each supported terminal type using terminal format requirements information for the terminal types supported by the service provider system; S808 indexing each the adapted content message with a corresponding terminal type identifier and the message identifier; and S810 formatting message notifications containing the message identifier for each subscriber address based on subscriber terminal messaging capabilities information for the corresponding subscriber terminals. Additionally, the method may include the steps of: S812 sending the formatted message notifications to the subscriber terminal addresses; S814 receiving requests for the multimedia message from subscriber terminals in response to sending the formatted message notifications to the subscriber terminal addresses, each request containing terminal type information, an address for the requesting subscriber terminal, and the message identifier; S816 selecting a the adapted content message for each request based on the message identifier and the terminal type information; and S818 sending the selected adapted message to the corresponding subscriber terminal address associated with each request.

Figure 9:
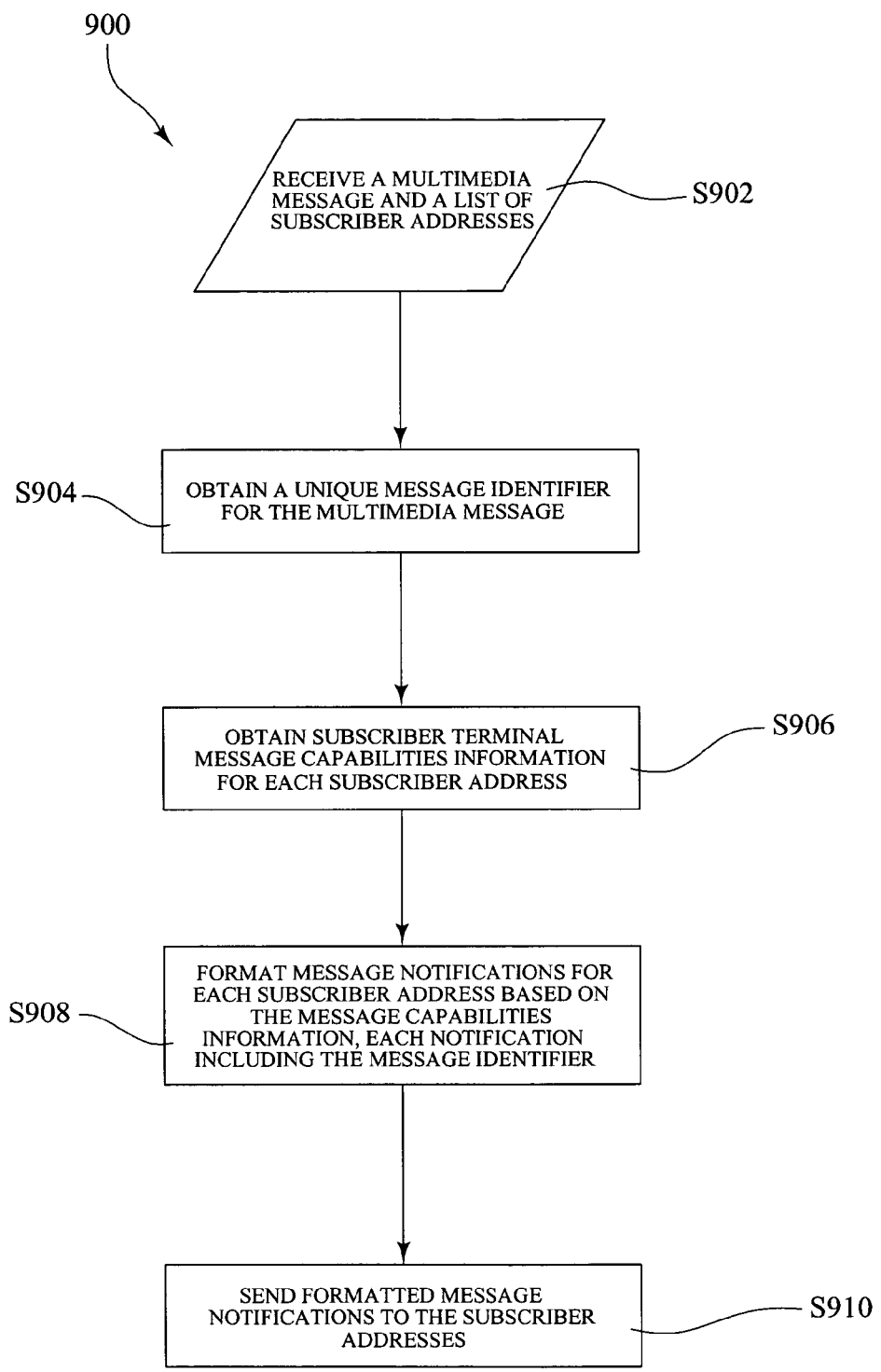
FIG. 9 is a flow diagram of an exemplary device level method for a processing platform according to an aspect of the present invention.

FIG. 9 shows an exemplary method 900 of providing mass multimedia message notification to subscriber terminals wherein at least some of the terminals have different messaging capabilities. The method includes the steps of: S902 receiving a multimedia message and a list of subscriber terminal addresses from a content provider; S904 obtaining a unique message identifier for the multimedia message; S906 obtaining subscriber terminal messaging capabilities information for each subscriber address; and S908 formatting message notifications for each subscriber terminal address based on the subscriber terminal messaging capabilities information, the message notifications each including the message identifier. When the method is performed on a processing platform 106, as described above, the step of S904 obtaining a unique message identifier could include the steps of: sending the multimedia message to the retrieval platform 104, and receiving the unique message identifier from the retrieval platform 104. Further, where the method uses a subscriber information database 108, as described above, the step of S906 obtaining subscriber terminal messaging capabilities information could include the steps of: requesting the subscriber terminal messaging capabilities information for each subscriber terminal from the subscriber information database 108, and receiving the subscriber terminal messaging capabilities information for each subscriber terminal from the subscriber information database 108. Still further, the method could include the step of S910 sending the formatted message notifications to the subscriber terminals using the subscriber terminal addresses.

Figure 10:
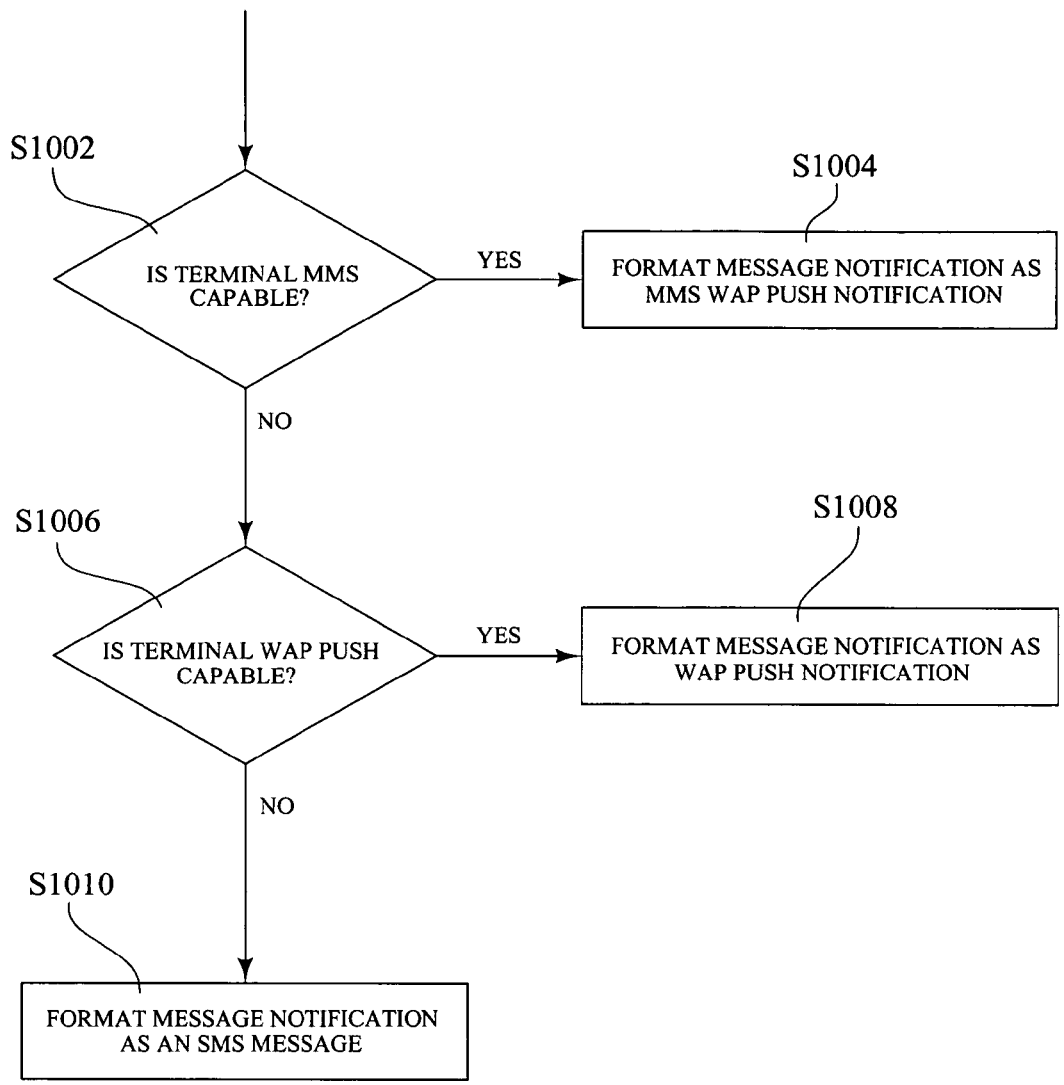
FIG. 10 is a flow diagram of a step of formatting message notifications of the method shown in FIG. 9.

FIG. 10 shows a situation where subscriber mobile terminals are either SMS, WAP Push, or MMS capable. Then, the step of S908 formatting message notifications for each subscriber address could also include the steps of: S1002 determining if the terminal is MMS capable; if yes, then S1004 formatting the message notification as an MMS WAP Push notification; in no, then S1006 determining if the terminal is WAP Push capable; if yes, then S1008 formatting the message notification as a WAP Push notification; if no, then S1010 formatting the message notifications as an SMS messages.

Figure 11:
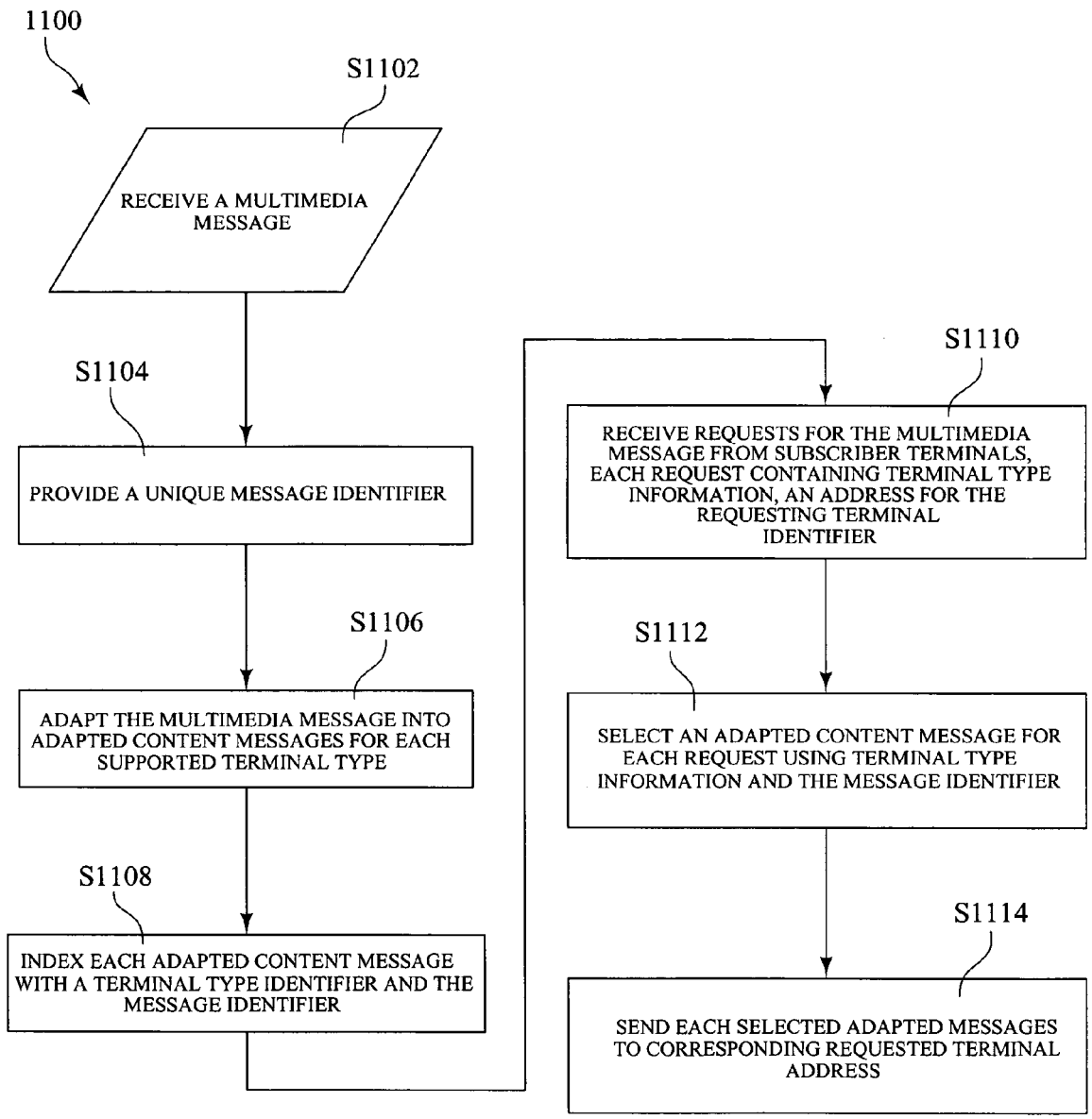
FIG. 11 is a flow diagram of an exemplary device level method for a retrieval platform according to an aspect of the present invention.

FIG. 11 shows an exemplary method 1100 of mass multimedia message adaptation and handling in a system including a service provider and a plurality of terminals supported by the service provider, wherein at least some of said terminals are of different terminal types. The method includes the steps of: S1102 receiving a multimedia message; S1104 providing a unique message identifier for said multimedia message; S1106 adapting said multimedia message into adapted content messages for each supported terminal type using terminal format requirements information for the terminal types supported by the service provider; and S1108 indexing each adapted content message with a corresponding terminal type identifier and with said message identifier, so as to enable the adapted content messages to be later retrieved by subscriber terminals requesting the multimedia message using the message identifier and terminal type identifiers. When the method is performed on a retrieval platform 104, as described above, the step of receiving the multimedia message could include receiving the message form a processing platform 106, and could further include the step of sending the unique message identifier to the processing platform 106. Further, where the method uses a user agent profiles database 110, as described above, the step of S1106 adapting the multimedia message into adapted content messages could include the step of obtaining the terminal format requirements information from the user agent profiles database 110. Still further, the method could further include the step of storing the indexed adapted content messages in a table associated with the message identifier.

The method 1100 could still further include steps directed at delivery of adapted content message to the subscriber terminals 102, including: S1110 receiving requests for said multimedia message from subscriber terminals 102, each said request containing terminal type information for the requesting subscriber terminal, the address for the requesting subscriber terminal, and said message identifier; S1112 selecting an adapted content message for each request using said message identifier and said terminal type information; and S1114 sending said selected adapted messages to said corresponding subscriber terminals.

Returning now to FIG. 1, the reporting platform 114 is in communication with the processing platform 106, the retrieval platform 104 and the content provider 118. The reporting platform 114 provides a reporting interface for tracking how many subscribers have retrieved adapted content message versions of the multimedia message 122. In operation, the exemplary mass multimedia messaging system 100 generates a promotional identifier associated with the multimedia message 122. The system 100 then returns the promotional identifier to the content provider 118 following receipt of the multimedia message 122. Each time a adapted content message for a particular mass multimedia message 122 is retrieved by a subscriber terminal 102, the retrieval platform 104 communicates the retrieval information to the reporting platform 114, which tallies the retrieval information in a report associated with the promotional identifier. Periodically, the reporting platform 104 publishes the report to the content provider 118. Also, the content provider 118 can access the report containing the retrieval information using the promotional identifier. The promotional identifier can be identical to the unique message identifier, or it can be another unique identifier.

Additionally, the content provider 118 can use the promotional identifier to issue an order to the mass multimedia messaging system 100 to replace/update or cancel the message 122 associated with that promotional identifier. Further, the content provider 118 can use the promotional identifier to replace or cancel only specific parameters associated with the message, such as the list of subscriber terminal addresses to which the message is directed, or the expiration date of the promotion. Any replacement message or message parameters could then be pre-adapted for the supported terminal types, as described earlier.

The system, including the described elements thereof, and the various database elements could be implemented on digital computing equipment, or the equivalent, through the use of computer programs, or the equivalent. Additionally, the various method aspects of the invention may also be found as executable instructions contained on a computer readable medium.

Thus, the invention provides a method and system for mass multimedia messaging, including adaptation and handling of a mass multimedia message, and mass multimedia message notification in a system having a service provider and a plurality of subscriber communication terminals supported by the service provider, wherein at least some of the subscriber communication terminals have different messaging capabilities and different message format requirements. One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A method of mass multimedia messaging in a system including a service provider and a plurality of terminals supported by the service provider, wherein at least some of said terminals are of terminal types have differing messaging capabilities and differing message format requirements, said method comprising:
   receiving a multimedia message and a list of subscriber terminal addresses from a content provider;
   generating a unique message identifier for said multimedia message;
   adapting said multimedia message into adapted content messages for each supported terminal type using terminal format requirements information for the terminal types supported by the service provider;
   indexing each said adapted content message with a corresponding terminal type identifier and said message identifier; and
   formatting message notifications containing said message identifier for each subscriber address based on subscriber terminal messaging capabilities information for the corresponding subscriber terminals,
   wherein said subscriber terminal messaging capabilities information includes information as to whether each subscriber terminal is SMS capable, WAP Push capable, or MMS capable, wherein said step of formatting each message notification further comprises:
   determining if the subscriber terminal is capable of receiving MMS messages;
   if it is determined that the subscriber terminal is capable of receiving MMS messages, then formatting the message notification as a MMS WAP Push notification;
   if it is determined that the subscriber terminal is not capable of receiving MMS messages, then determining if the subscriber terminal is capable of receiving WAP Push messages;
   if it is determined that the subscriber terminal is capable of receiving WAP Push messages, then formatting the message notification as a WAP Push notification; and
   if it is determined that the subscriber terminal is not capable of receiving WAP Push messages, then formatting the message notification as an SMS message.

2. The method of claim 1, further comprising:
   sending said formatted message notifications to said subscriber terminal addresses;
   receiving requests for said multimedia message from subscriber terminals in response to sending said formatted message notifications to said subscriber terminal addresses, each request containing terminal type information, an address for the requesting subscriber terminal, and said message identifier;
   selecting an adapted content message for each request based on said message identifier and said terminal type information; and
   sending said selected adapted message to the corresponding subscriber terminal address associated with each request.

3. The method of claim 1, further including adapting said multimedia message into a default adapted content message for a default terminal type using default terminal format requirements information, and indexing said default adapted content message with a default terminal type identifier and said message identifier.

4. The method of claim 2, further including:
   generating a promotional identifier associated with said multimedia message; and
   returning said promotional identifier to said content provider.

5. The method of claim 4, further including:
   receiving an order from said content provider to replace or cancel said multimedia message or to replace or cancel at least one parameter associated with said multimedia message, said order containing said promotional identifier.

6. The method of claim 4, further including:
   tallying retrieval information for said multimedia message in a report associated with said promotional identifier; and
   periodically publishing said report to said content provider.

7. The method of claim 6, further including:
   receiving a request for said report from said content provider; and
   publishing said report to said content provider in response to said request for said report.

8. A method of providing mass multimedia message notification to subscriber terminals wherein at least some of said terminals have different messaging capabilities, said method comprising:
   receiving a multimedia message and a list of subscriber terminal addresses from a content provider;
   obtaining a unique message identifier for said multimedia message;
   obtaining subscriber terminal messaging capabilities information for each subscriber address; and
   formatting message notifications for each subscriber terminal address based on said subscriber terminal messaging capabilities information, said message notifications each including said message identifier,
   wherein said subscriber terminal messaging capabilities information includes information as to whether each subscriber terminal is SMS capable, WAP Push capable, or MMS capable, wherein said step of formatting each message notification further comprises:
   determining if the subscriber terminal is capable of receiving MMS messages;
   if it is determined that the subscriber terminal is capable of receiving MMS messages, then formatting the message notification as a MMS WAP Push notification;
   if it is determined that the subscriber terminal is not capable of receiving MMS messages, then determining if the subscriber terminal is capable of receiving WAP Push messages;
   if it is determined that the subscriber terminal is capable of receiving WAP Push messages, then formatting the message notification as a WAP Push notification; and
   if it is determined that the subscriber terminal is not capable of receiving WAP Push messages, then formatting the message notification as an SMS message.

9. The method of claim 8, wherein said step of obtaining a unique message identifier for said multimedia message includes:

sending said multimedia message to a retrieval platform; and receiving said unique identifier from said retrieval platform.

10. The method of claim 8, wherein said step of obtaining subscriber terminal messaging capabilities information includes:

requesting said subscriber terminal messaging capabilities information for each subscriber terminal from a subscriber information database using said subscriber terminal addresses; and receiving said subscriber terminal messaging capabilities information for each subscriber terminal from said subscriber information database.

11. The method of claim 8, further including sending said formatted message notifications to said subscriber terminals using said subscriber terminal addresses.

12. A method of mass multimedia message adaptation and handling in a system including a service provider and a plurality of terminals supported by the service provider, wherein at least some of said terminals have different message format requirements, said method comprising:

receiving a multimedia message;

providing a unique message identifier for said multimedia message;

adapting said multimedia message into adapted content messages for each supported terminal type using terminal format requirements information for the terminal types supported by the service provider;

indexing each of said adapted content messages with a corresponding terminal type identifier and with said message identifier, so as to enable the adapted content message to be later retrieved by subscriber terminals requesting the multimedia message using the message identifier and terminal type identifiers, wherein requests by subscriber terminals include subscriber terminal messaging capabilities information including information as to whether a requesting subscriber terminal is SMS capable, WAP Push capable, or MMS capable; and formatting each requested message the formatting further comprising:

determining if the requesting subscriber terminal is capable of receiving MMS messages;

if it is determined that the requesting subscriber terminal is capable of receiving MMS messages, then formatting the message as a MMS WAP Push message;

if it is determined that the requesting subscriber terminal is not capable of receiving MMS messages, then determining if the requesting subscriber terminal is capable of receiving WAP Push messages;

if it is determined that the requesting subscriber terminal is capable of receiving WAP Push messages, then formatting the message as a WAP Push message; and if it is determined that the requesting subscriber terminal is not capable of receiving WAP Push messages, then formatting the message as an SMS message.

13. The method of claim 12, wherein said step of receiving a multimedia message includes receiving the multimedia message from a processing platform.

14. The method of claim 12, further including sending said message identifier to a processing platform.

15. The method of claim 12, wherein said terminal format requirements information is stored in a user agent profiles database, further including obtaining said terminal format requirements information for terminal types supported by the system from said user agent profiles database.

16. The method of claim 12, further including storing said indexed adapted content messages in a table associated with said message identifier.

17. The method of claim 12, further comprising:

receiving requests for said multimedia message from subscriber terminals, each said request containing terminal type information for the requested subscriber terminal, an address for the requesting subscriber terminal, and said message identifier;

selecting an adapted content message for each request based on said message identifier and said terminal type information; and sending said selected adapted message to the corresponding subscriber terminal address associated with each request.

18. The method of claim 12, further including adapting said multimedia message into a default adapted content message for a default terminal type using default terminal format requirements information, and indexing said default adapted content message with a default terminal type identifier and said message identifier.

19. The method of claim 12, further including:

generating a promotional identifier associated with said multimedia message.

20. The method of claim 19, further including:

receiving an order to replace or cancel said multimedia message or to replace or cancel at least one parameter associated with said multimedia message, said order containing said promotional identifier.

21. The method of claim 19, further including:

tallying retrieval information for said multimedia message in a report associated with said promotional identifier; and periodically publishing said report.

22. The method of claim 21, further including:

receiving a request for said report; and publishing said report in response to said request for said report.

23. A system for mass multimedia messaging by a service provider, wherein the service provider supports communication terminals having different format requirements and different messaging capabilities, and wherein a content provider provides a multimedia message and a list of subscriber terminal addresses to which the service provider is to deliver the message, said system comprising:

a retrieval platform for:

providing a unique message identifier for said multimedia message;

adapting said multimedia message into adapted content messages for each supported terminal type based on terminal format requirements information for the terminal types supported by the service provider; and indexing each of said adapted content messages with a corresponding terminal type identifier and with said message identifier, so as to enable the adapted content message to be retrieved by a subscriber terminal requesting the multimedia message using the message identifier and terminal type identifiers; and a processing platform in communication with said retrieval platform, said processing platform for:

obtaining subscriber terminal messaging capabilities information for each subscriber address; and formatting message notifications for each subscriber terminal address based on said subscriber terminal messaging capabilities information, said messaging notifications each containing said message identifier, wherein said subscriber terminal messaging capabilities information includes information as to whether each subscriber terminal is SMS capable, WAP Push capable, or MMS capable, wherein said step of formatting each message notification further comprises:
    determining if the subscriber terminal is capable of receiving MMS messages;
    if it is determined that the subscriber terminal is capable of receiving MMS messages, then formatting the message notification as a MMS WAP Push notification;
    if it is determined that the subscriber terminal is not capable of receiving MMS messages, then determining if the subscriber terminal is capable of receiving WAP Push messages;
    if it is determined that the subscriber terminal is capable of receiving WAP Push messages, then formatting the message notification as a WAP Push notification; and
    if it is determined that the subscriber terminal is not capable of receiving WAP Push messages, then formatting the message notification as an SMS message.

24. The system of claim 23, further having a user agent profiles database relating supported terminal type information with terminal format requirements information, and an adaptation engine for adapting multimedia messages for supported terminal types, said adaptation engine being in communication with said user agent profiles database and said retrieval platform, said adaptation engine for:
    receiving said multimedia message from said retrieval platform;
    obtaining terminal format requirements information for terminal types supported by said service provider system from said user agent profiles database;
    adapting said multimedia message into adapted content messages for each supported terminal type using said terminal format requirements information; and
    returning said adapted content messages and corresponding terminal type identifiers to said retrieval platform.

25. The system of claim 23, further having a subscriber information database relating subscriber terminal address information with subscriber terminal messaging capabilities information, said subscriber information database being in communication with said processing platform, such that said processing platform is able to obtain said subscriber terminal messaging capabilities information from said subscriber information database.

26. The system of claim 23, wherein said retrieval platform is further for:
    receiving requests for said multimedia message from subscriber terminals, each request containing terminal type information for the requesting terminal, an address for the requesting terminal and said message identifier;
    selecting an adapted content message for each request using said message identifier and said terminal type information.

27. The system of claim 23, further having a reporting platform for tracking how many subscribers have retrieved the multimedia message, said reporting platform in communication with said processing platform, said retrieval platform and said content provider.

28. A computer readable medium having computer executable instructions for performing a method of mass multimedia messaging in a system including a service provider and a plurality of terminals supported by the service provider, wherein at least some of said terminals are of terminal types have differing messaging capabilities and differing message format requirements, said method comprising:
    receiving a multimedia message and a list of subscriber terminal addresses from a content provider;
    generating a unique message identifier for said multimedia message;
    adapting said multimedia message into adapted content messages for each supported terminal type using terminal format requirements information for the terminal types supported by the service provider;
    indexing each said adapted content message with a corresponding terminal type identifier and said message identifier; and
    formatting message notifications containing said message identifier for each subscriber address based on subscriber terminal messaging capabilities information for the corresponding subscriber terminals,
    wherein said subscriber terminal messaging capabilities information includes information as to whether each subscriber terminal is SMS capable, WAP Push capable, or MMS capable, wherein said step of formatting each message notification further comprises:
    determining if the subscriber terminal is capable of receiving MMS messages;
    if it is determined that the subscriber terminal is capable of receiving MMS messages, then formatting the message notification as a MMS WAP Push notification;
    if it is determined that the subscriber terminal is not capable of receiving MMS messages, then determining if the subscriber terminal is capable of receiving WAP Push messages;
    if it is determined that the subscriber terminal is capable of receiving WAP Push messages, then formatting the message notification as a WAP Push notification; and
    if it is determined that the subscriber terminal is not capable of receiving WAP Push messages, then formatting the message notification as an SMS message.

29. The computer readable medium of claim 28, including executable instructions further including the steps of:
    sending said formatted message notifications to said subscriber terminal addresses;
    receiving requests for said multimedia message from subscriber terminals in response to sending said formatted message notifications to said subscriber terminal addresses, each request containing terminal type information, an address for the requesting subscriber terminal, and said message identifier;
    selecting a said adapted content message for each request based on said message identifier and said terminal type information; and
    sending said selected adapted message to the corresponding subscriber terminal address associated with each request.

30. A computer readable medium having executable instructions for performing a method of providing mass multimedia message notification to subscriber terminals wherein at least some of said terminals have different messaging capabilities, where said method comprises:
    receiving a multimedia message and a list of subscriber terminal addresses from a content provider;
    obtaining a unique message identifier for said multimedia message;
    obtaining subscriber terminal messaging capabilities information for each subscriber address; and
    formatting message notifications for each subscriber terminal address based on said subscriber terminal messaging capabilities information, said message notifications each including said message identifier, wherein said subscriber terminal messaging capabilities information includes information as to whether each subscriber terminal is SMS capable, WAP Push capable, or MMS capable, wherein said step of formatting each message notification further comprises:
determining if the subscriber terminal is capable of receiving MMS messages;
if it is determined that the subscriber terminal is capable of receiving MMS messages, then formatting the message notification as a MMS WAP Push notification;
if it is determined that the subscriber terminal is not capable of receiving MMS messages, then determining if the subscriber terminal is capable of receiving WAP Push messages;
if it is determined that the subscriber terminal is capable of receiving WAP Push messages, then formatting the message notification as a WAP Push notification; and
if it is determined that the subscriber terminal is not capable of receiving WAP Push messages, then formatting the message notification as an SMS message.

31. A computer readable medium having computer executable instructions for performing a method of mass multimedia message adaptation and handling in a system including a service provider and a plurality of terminals supported by the service provider, wherein at least some of said terminals have different message format requirements, where said method comprises:
receiving a multimedia message;
providing a unique message identifier for said multimedia message;
adapting said multimedia message into adapted content messages for each supported terminal type using terminal format requirements information for the terminal types supported by the service provider;
indexing each of said adapted content messages with a corresponding terminal type identifier and with said message identifier, so as to enable the adapted content message to be later retrieved by subscriber terminals requesting the multimedia message using the message identifier and terminal type identifiers, wherein requests by subscriber terminals include subscriber terminal messaging capabilities information including information as to whether a requesting subscriber terminal is SMS capable, WAP Push capable, or MMS capable; and
formatting each requested message the formatting further comprising:
determining if the requesting subscriber terminal is capable of receiving MMS messages;
if it is determined that the requesting subscriber terminal is capable of receiving MMS messages, then formatting the message as a MMS WAP Push message;
if it is determined that the requesting subscriber terminal is not capable of receiving MMS messages, then determining if the requesting subscriber terminal is capable of receiving WAP Push messages;
if it is determined that the requesting subscriber terminal is capable of receiving WAP Push messages, then formatting the message as a WAP Push message; and
if it is determined that the requesting subscriber terminal is not capable of receiving WAP Push messages, then formatting the message as an SMS message.

32. The computer readable medium of claim 31, including executable instructions further including the steps of:
receiving requests for said multimedia message from subscriber terminals, each said request containing terminal type information for the requested subscriber terminal, an address for the requesting subscriber terminal, and said message identifier;
selecting an adapted content message for each request using said message identifier and said terminal type information; and
sending said selected adapted message to the corresponding subscriber terminal address associated with each request.

* * * * *